US011270426B2

(12) United States Patent
Salgian et al.

(10) Patent No.: US 11,270,426 B2
(45) Date of Patent: Mar. 8, 2022

(54) COMPUTER AIDED INSPECTION SYSTEM AND METHODS

(71) Applicant: SRI International, Menlo Park, CA (US)

(72) Inventors: Garbis Salgian, Princeton Junction, NJ (US); Bogdan C. Matei, Princeton Junction, NJ (US); Taragay Oskiper, Princeton, NJ (US); Mikhail Sizintsev, Plainsboro, NJ (US); Rakesh Kumar, West Windsor, NJ (US); Supun Samarasekera, Skillman, NJ (US)

(73) Assignee: SRI International, Menlo Park, CA (US)

( * ) Notice: Subject to any disclaimer, the term of this patent is extended or adjusted under 35 U.S.C. 154(b) by 147 days.

(21) Appl. No.: 16/412,067

(22) Filed: May 14, 2019

(65) Prior Publication Data

US 2019/0347783 A1 Nov. 14, 2019

Related U.S. Application Data

(60) Provisional application No. 62/670,985, filed on May 14, 2018.

(51) Int. Cl.
*G06K 9/00* (2006.01)
*G06T 7/00* (2017.01)
(Continued)

(52) U.S. Cl.
CPC .......... *G06T 7/0004* (2013.01); *G01B 11/022* (2013.01); *G01B 11/026* (2013.01);
(Continued)

(58) Field of Classification Search
CPC ......... G06T 19/006; G06T 2207/10028; G06T 7/70; G06T 17/00; G06T 2219/2004;
(Continued)

(56) References Cited

U.S. PATENT DOCUMENTS 8,391,592 B2 3/2013 Han et al.
8,761,439 B1 6/2014 Kumar et al.
(Continued)

FOREIGN PATENT DOCUMENTS

JP H09-189526 A 7/1997
JP 2014002536 A * 1/2014
(Continued)

OTHER PUBLICATIONS

Kopsida et al., BIM Registration Methods for Mobile Augmented Reality-Based Inspection, Conference Paper Sep. 2016, submitted Dec. 2016, https://www.researchgate.net/publication/311607258, pp. 1-8.*

(Continued)

*Primary Examiner* — Guillermo M Rivera-Martinez
(74) *Attorney, Agent, or Firm* — Moser Taboada

(57) ABSTRACT

Computer aided inspection systems (CAIS) and method for inspection, error analysis and comparison of structures are presented herein. In some embodiments, a CAIS may include a SLAM system configured to determine real-world global localization information of a user in relation to a structure being inspected using information obtained from a first sensor package, a model alignment system configured to: use the determined global localization information to index into a corresponding location in a 3D computer model of the structure being inspected; and align observations and/or information obtained from the first sensor package to the local area of the model 3D computer model of the structure extracted; a second sensor package configured to obtain fine level measurements of the structure; and a model recognition system configured to compare the fine level measurements and information obtained about the structure from the second sensor package to the 3D computer model.

15 Claims, 11 Drawing Sheets

(51) Int. Cl.
*G02B 27/01* (2006.01)
*G01B 11/02* (2006.01)

(52) U.S. Cl.
CPC ...... *G02B 27/017* (2013.01); *G02B 2027/014* (2013.01); *G02B 2027/0138* (2013.01); *G06T 2207/10028* (2013.01)

(58) Field of Classification Search
CPC ... G06T 2200/04; G06T 7/75; G06K 9/00671; G06K 9/00201; G06K 9/00362
See application file for complete search history.

(56) References Cited

U.S. PATENT DOCUMENTS

| | | | |
|---|---|---|---|
| 9,031,809 B1 | 5/2015 | Kumar et al. | |
| 9,476,730 B2 | 10/2016 | Samarasekera et al. | |
| 2003/0033041 A1* | 2/2003 | Richey | G05B 19/4097 700/98 |
| 2011/0282622 A1* | 11/2011 | Canter | G06K 9/00691 702/150 |
| 2012/0249741 A1* | 10/2012 | Maciocci | G06T 15/503 348/46 |
| 2013/0096873 A1* | 4/2013 | Rosengaus | G01C 15/002 702/151 |
| 2014/0184786 A1* | 7/2014 | Georgeson | G01N 21/8422 348/128 |
| 2014/0368373 A1* | 12/2014 | Crain | H01Q 15/14 342/5 |
| 2015/0253766 A1* | 9/2015 | Pettersson | G05B 19/41805 700/168 |
| 2016/0006951 A1* | 1/2016 | Moghadam | G06T 11/008 348/164 |
| 2016/0314571 A1* | 10/2016 | Finn | G06F 16/40 |
| 2016/0321827 A1* | 11/2016 | Xiao | G06K 9/00 |
| 2017/0168160 A1* | 6/2017 | Metzler | G01S 5/163 |
| 2017/0205892 A1* | 7/2017 | Petrovskaya | G06F 3/005 |
| 2017/0206648 A1* | 7/2017 | Marra | G05D 1/0038 |
| 2017/0277180 A1* | 9/2017 | Baer | G01S 17/933 |
| 2018/0003507 A1* | 1/2018 | Arslan | G01C 21/28 |
| 2018/0020203 A1* | 1/2018 | Miura | G06K 9/00671 |
| 2018/0045963 A1* | 2/2018 | Hoover | H04N 13/239 |
| 2018/0082414 A1* | 3/2018 | Rozenberg | G06T 7/75 |
| 2019/0033064 A1* | 1/2019 | Becker | H04N 13/25 |
| 2019/0197768 A1* | 6/2019 | Taylor | A63F 13/65 |
| 2019/0258225 A1* | 8/2019 | Link | G06T 19/20 |
| 2019/0325089 A1* | 10/2019 | Golparvar-Fard | G06F 3/04815 |
| 2020/0065585 A1* | 2/2020 | Sato | G06T 7/0004 |
| 2020/0217666 A1* | 7/2020 | Zhang | H04W 4/029 |

FOREIGN PATENT DOCUMENTS

| | | |
|---|---|---|
| JP | 2015001146 A | 1/2015 |
| JP | 2017-20972 A | 1/2017 |
| JP | 2017151026 A | 8/2017 |
| KR | 101583723 B1 | 1/2016 |

OTHER PUBLICATIONS

Shang et al., Real-time 3D Reconstruction on Construction Site using Visual SLAM and UAV, Dec. 2017, https://arxiv.org/ftp/arxiv/papers/1712/1712.07122.pdf, pp. 1-10.*

Hasan et al., Construction Inspection through Spatial Database, Nov. 2016, https://arxiv.org/ftp/arxiv/papers/1611/1611.03566.pdf, pp. 1-8.*

Han_2013 (Han, K., Gwak, JY., Golparvar-Fard, M., Vision-Based Field Inspection of Concrete Reinforcing Bars, Proceedings of the 13th International Conference on Construction Applications of Virtual Reality; Oct. 30-31, 2013, London UK) (Year: 2013).

Kyriazis_2007 (Detecting Features from Sliced Point Clouds, Proceedings of the Second International Conference on Computer Graphics Theory and Applications, GRAPP, 2007) (Year: 2007).

Issa_2005 (An Experimental Study of Welded Splices of Reinforcing Bars, Building and Environment 41 2006 1394-1405). (Year: 2006).

Yang_2017 (Stereo Image Point Cloud and LIDAR Point Cloud Fusion For the 30 Street Mapping, IGTF 2017, Mar. 11-17, 2017). (Year: 2017).

Duan_2015 (Vanishing Points Detection and Line Grouping for Complex Building Fa<;:ade Identification, WSCG 2010). (Year: 2015).

Yang_2016 (Object contour with a fully convolutional encoder-decoder network, Proc. IEEE Conf. Comput. Vis. Pattern Recognit., pp. 193-22, 2016). (Year: 2016).

Jian_2009 (texture image classification using visual perceptual texture features and Gabor Wavelet Features, Journal of Computers, vol. 4, No. 8, Aug. 2009). (Year: 2009).

Jorgensen_2015 (Geometric Edge Detection and Classification in Point Clout Data with Application to 3D Object Recognition, Scritepress 2015). (Year: 2015).

International Preliminary Report on Patentability dated Nov. 26, 2020 for Application No. PCT/US2019/032276, 5 pages.

* cited by examiner

COMPUTER AIDED INSPECTION SYSTEM AND METHODS

CROSS-REFERENCE

This application claims the benefit of U.S. Provisional Application No. 62/670,985 filed on May 14, 2018. The entire content of Application No. 62/670,985 is incorporated herein by reference.

FIELD

Embodiments of the present invention generally relate to computer aided inspection systems (CAIS) and methods and, more particularly, to methods and systems for using augmented reality and localization techniques to assist in performing fine level inspections and comparisons to 3D model of structures for applications such as surveying, inspection, maintenance and repair.

BACKGROUND

Currently inspection of structures (e.g., railroad tracks, bridges, buildings or parts thereof, "as-built" sites, vehicles (e.g., ships, aircraft, cars, etc.), and the like) is done manually. This is a very slow and tedious process that must be performed to ascertain compliance of the structure to design plans, building codes, building models, etc. As labor costs increase and finding skilled labor to perform inspections, and associated repairs/maintenance as required, it becomes prohibitively expensive to perform manual inspections, both in manpower costs and delays waiting for inspections to be completed.

In many cases, certain mistakes are too costly to fix after a certain point (e.g., tearing up rail road tracks if an error is later discovered). Thus, construction/work cannot continue on certain structures until the inspection is completed. Therefore, it is necessary to ensure that various aspects of the construction are done according to plan/code. Furthermore, to inspect large scale structures and construction sites, it requires a lot of time and manpower to search the site for the structures, or portions thereof, that need to be inspected, carry all the necessary drawings/plans, inspect the site, mark any inconsistencies, etc.

Thus, there is a need to replace tedious and slow manual work with system and methods that can assist in performing automated fine level inspections and comparisons to models of large areas/structures for applications such as surveying, inspection, maintenance and repair.

SUMMARY

Computer aided inspection systems (CAIS) and method for inspection, error analysis and comparison of structures are presented herein. In some embodiments, a CAIS may include a SLAM system configured to determine real-world global localization information of a user in relation to a structure being inspected using information obtained from a first sensor package, a model alignment system configured to: use the determined global localization information to index into a corresponding location in a 3D computer model of the structure being inspected; and align observations and/or information obtained from the first sensor package to the local area of the model 3D computer model of the structure extracted; a second sensor package configured to obtain fine level measurements of the structure; and a model recognition system configured to compare the fine level measurements and information obtained about the structure from the second sensor package to the 3D computer model.

In some embodiments, a computer aided inspection method for inspection, error analysis and comparison of structures may include determining real-world global localization information of a user in relation to a structure being inspected using information obtained from a first sensor package; using the determined global localization information to index into a corresponding location in a 3D computer model of the structure being inspected and extract the relevant parts of the model; aligning observations and/or information obtained from the first sensor package to the 3D computer model of the structure; and obtaining fine level measurements using a second sensor package to compare information obtained about the structure from the second sensor package to the 3D computer model of the structure.

In some embodiments, a computer aided inspection method for inspection, error analysis and comparison of structures may include receiving a 3D computer model of a structure from a first sensor package; generating a 3D point cloud representation of the structure using fine level measurements and information about the structure obtained from high-resolution sensors configured to obtain mm level measurements; detecting objects of interest in the 3d point cloud representation of the structure, and obtaining measurements and information of said objects of interest using the high-resolution sensors; aligning the 3D point cloud representation of the structure to the 3d computer model received; and detecting discrepancies between the objects of interest and the 3d computer model received Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
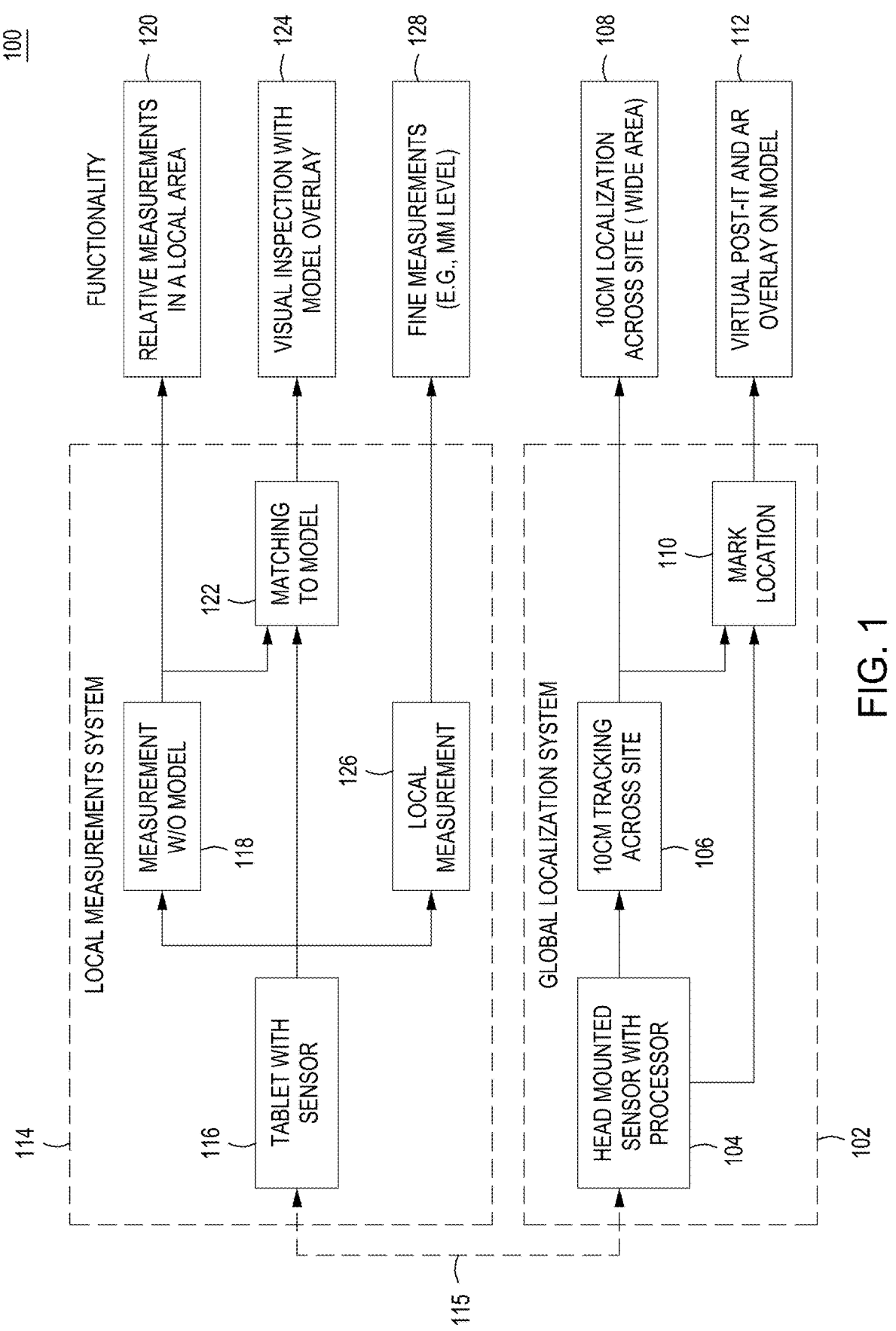
FIG. 1 depicts a high-level block diagram of a computer aided inspection system (CAIS) in accordance with embodiments of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to computer aided inspection systems (CAIS) and methods and, more particularly, to methods and systems for using augmented reality and localization techniques to assist in performing fine level inspections and comparisons to 3D model of structures for applications such as inspection, surveying, error detection and analysis, maintenance and repair. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to computer aided inspection system and methods and, such teachings should not be considered limiting. Embodiments in accordance with the present principles can be applied to inspection, surveying, error detection, maintenance and repair of any type of structures and other such concepts as described herein.

Embodiments in accordance with the present principles are directed to a system to aid in inspection process of structures such as railroad tracks, bridges, buildings or parts thereof, "as-built" sites, vehicles (e.g., ships, aircraft, cars, etc.), and the like. The inventive embodiments presented herein perform fine level inspection (at mm scale) and comparison to 3D computer models (e.g., a CAD drawing of a ship, a Building Information Model (BIM) of a building, or parts thereof) over large, multi-floor areas (e.g., 200 m×200 m or larger). The inventive methods and systems combine global localization to a certain accuracy (e.g., 10 cm) with very precise (e.g., mm-level) relative local measurements and comparison to 3D computer models.

As will be described below in further detail, embodiments consistent with the present disclosure generally performs computer aided inspection by localizing user to within a local area (e.g. within 10 cm), using the localization to index to a corresponding position in a 3D computer model and extract the relevant parts of the model (for instance a CAD 3D representation such as a BIM model), match observations from sensors to model, and finally make fine level measurements (at mm scale) and comparisons to the 3D model.

Various embodiments of computer aided inspection systems (CAIS) and methods and, more particularly, to methods and systems for using augmented reality and localization techniques to assist in performing fine level inspections and comparisons to 3D model of structures for applications such as surveying, inspection, maintenance and repair, are now described in detail with respect to FIGS. 1-9.

FIG. 1 depicts a high-level block diagram of a computer aided inspection system (CAIS) 100 in accordance with embodiments of the present principles. The CAIS 100 includes a global localization system 102 and a local measurement system 114.

Global localization performed by the GLS 102 works by acquiring and tracking image features using a first sensor package 104 and matching visual landmarks, tags, or location coordinates to a pre-built map of the area. Using information acquired by the first sensor package 104, the GLS 102 is able to track a user's location across a worksite (e.g., a construction site, a ship or ship building yard, railroad tracks, etc.) to within 5-15 cm, or about 10 cm, in a global coordinate systems at 106 in FIG. 1. The GLS 102 is then able to use the tracking information localize the user to within that same level of precision in a model coordinate system associated with the 3D computer model of the structure/site being inspected at 108 (i.e., index into the model at a corresponding location).

Figure 2A:
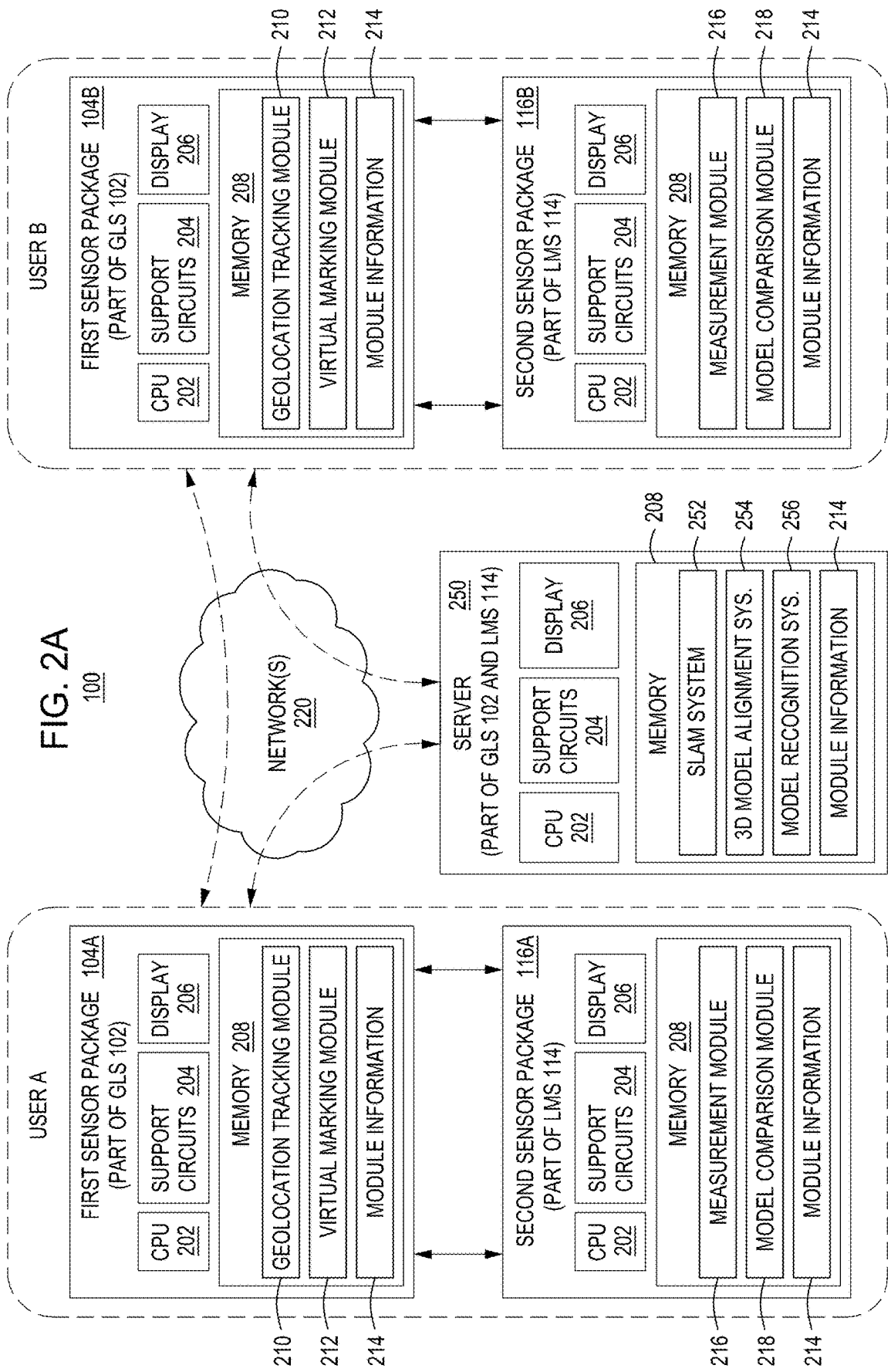
FIGS. 2A and 2B depicts additional representations of a high-level block diagram of a computer aided inspection system (CAIS) in accordance with embodiments of the present principles.
Figure 2B:
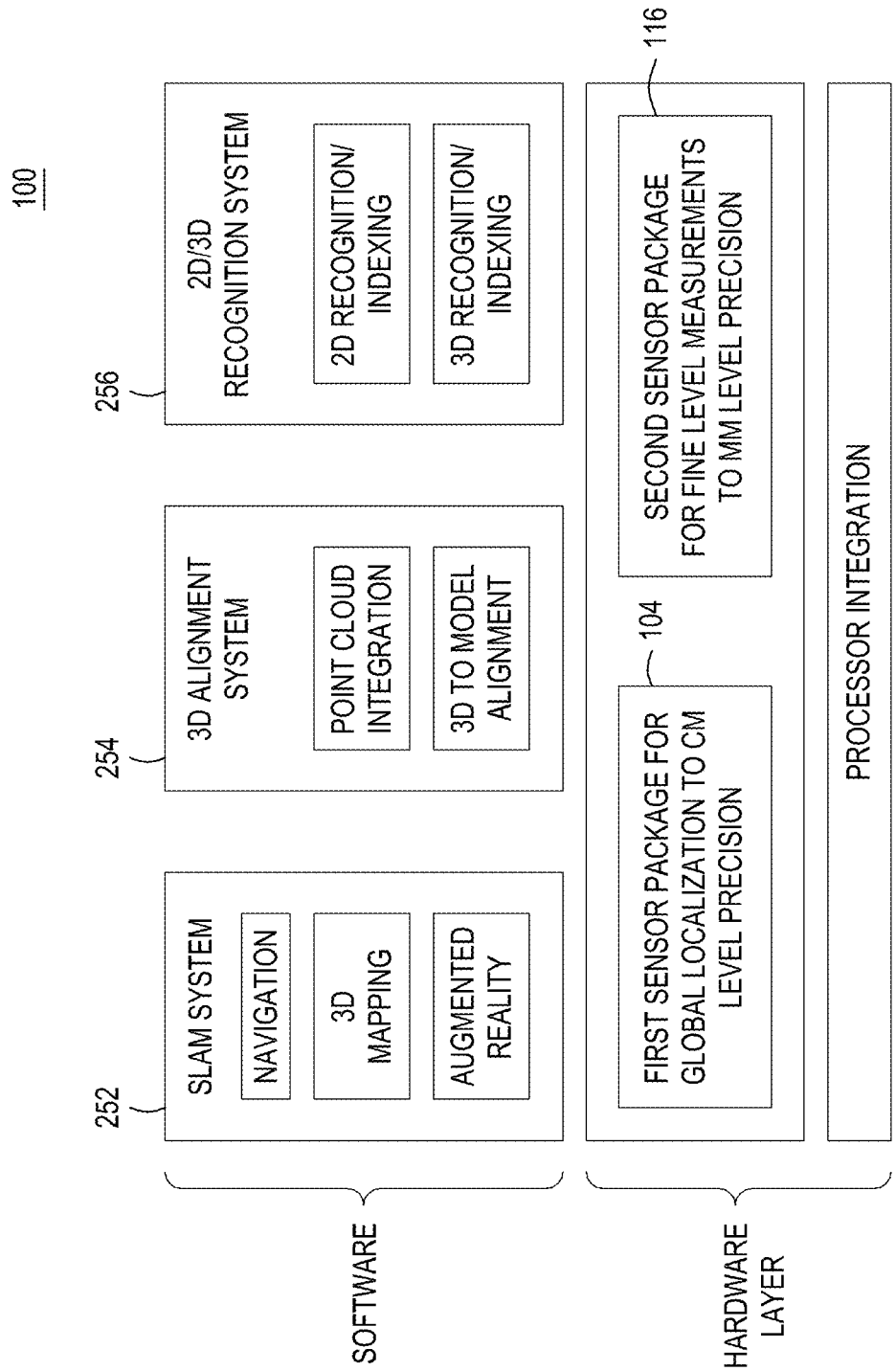
Figure 3:
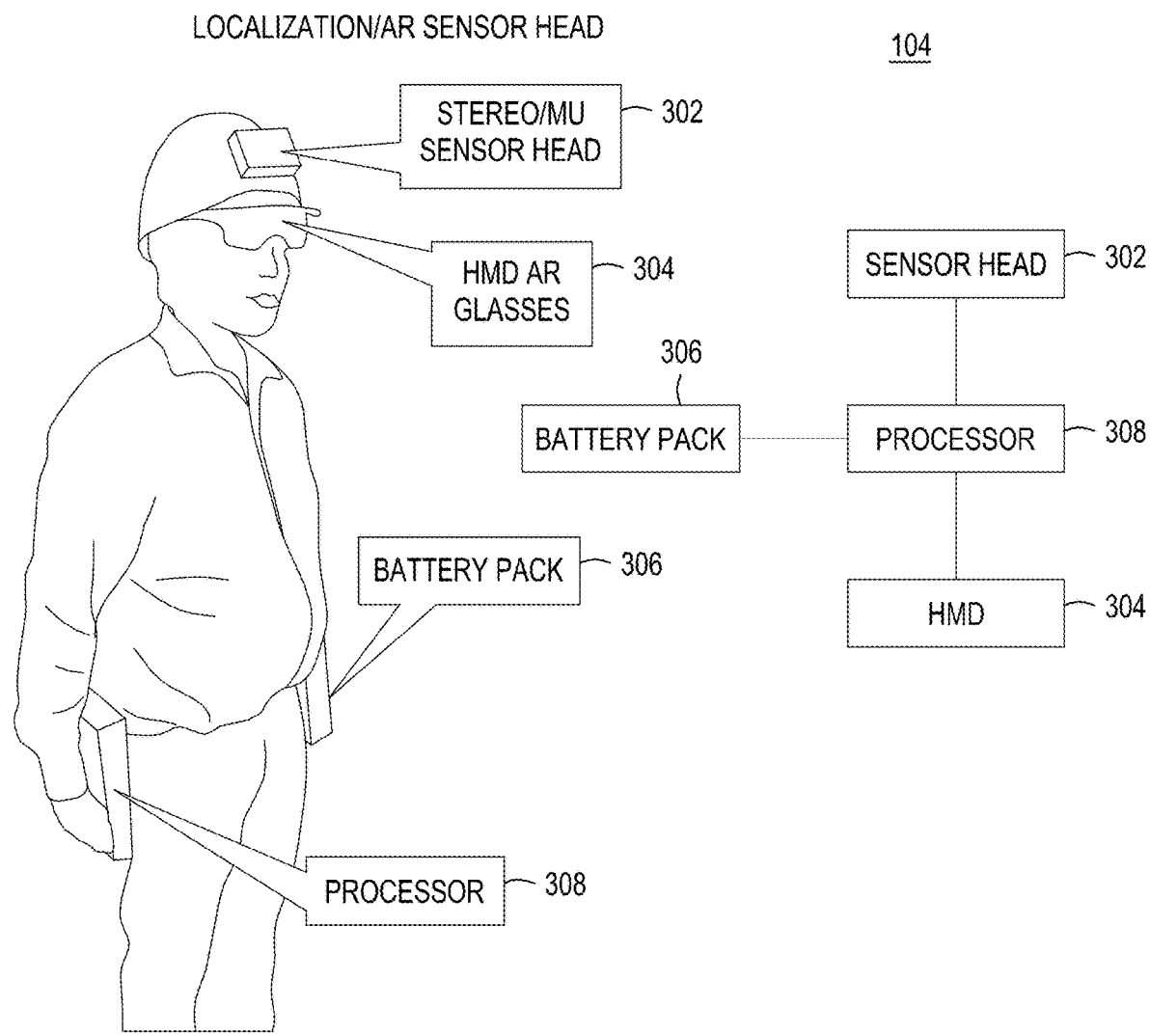
FIG. 3 depicts at least one embodiment of a first global localization sensor package worn by a user in accordance with an embodiment of the present principles.

The GLS 102 uses a simultaneous localization and mapping (SLAM) system 252 as shown in FIGS. 2A and 2B configured to determine real-world global localization information of a user in relation to a structure being inspected using information obtained from a first sensor package 104. It does so by estimating both navigation states and landmark positions simultaneously which is consistent SLAM problem formulation, which is also known as bundle adjustment in computer vision. In some embodiments, the user starts at a designated surveyed location(s) with a known visual pattern. The system is able to initialize its global position and heading based on this process. Then as the user moves around the site the system can localize his position to approximately 5-15 cm, or about 10 cm, accuracy. In some embodiments, the first sensor package 104 used for global localization is a wearable sensor package with one or more wide field of view cameras, IMUs, barometer, altimeter, magnetometer, GPS, etc. In some embodiments, global localization (also referred to as worksite localization) is accomplished by information collected from a helmet worn compact sensor package and a belt-worn processor as shown in FIG. 3. Specifically, FIG. 3 shows a user wearing elements of the first sensor package 104 used for global localization, including a helmet mounted stereo camera and IMU sensor 302, a Helmet Mounted Display (HMD) augmented reality (AR) goggles/glasses 304, a belt mounted battery pack 306, and a processor 308 which links all the other elements of the first sensor package 104.

In some embodiments, standard location-based technology (e.g., GPS, etc.) may be used by the SLAM system 252 to perform global localization. In other embodiments, GPS data/service may not be available, may be restricted, or may be denied. In GPS-denied or GPS-restricted environments, collaborative navigation and mapping, and location detection based on landmark or object detection may be used by the SLAM system 252 to localize a user within a global coordinate system as well as the 3D computer model coordinate system. In some embodiments, the GLS 102 may further use functionality from the 3D model alignment system 254 which uses the determined global localization information to index into a corresponding location in a 3D computer model of the structure being inspected and extract a local area of the 3D computer model. The 3D model alignment system 254 will then align observations and/or information obtained from the first sensor package 104 to the local area of the model 3D computer model of the structure extracted.

In some embodiments, visual tags (e.g., QR type codes, or other easily identifiable objects) placed in real-world locations over a worksite/construction area are used for precise model to map alignment and improved map-based tracking, navigation, and localization. Tags may be used to enhance SLAM framework to automatically generate a model-aligned map with minimal overhead and little to no user intervention. In order accomplish this, a few surveyed points available in the real world are used with attached model coordinates (i.e., real world tags). In some embodiments, at least three non-linear points are used, and in one embodiment, those points are relatively spaced apart from each—the further the better. This is usually accomplished via a total station, an electro-optical instrument for precise distance measurements. In some embodiments, all surveyed points are identified as tags and stored as 3D-2D tie-points. In addition to surveyed tags, the SLAM framework can take advantage of un-surveyed tags in the environment all of which act as special landmarks that can be matched across wide baseline and across different scales. At the end, during a bundle adjustment process, surveyed tags are used for global alignment of the two coordinate frames (i.e., the global and 3D model coordinate systems) and refinement of the map, as a byproduct of which, we also obtain the 3D corner coordinates of the un-surveyed tags. Furthermore, excluding a subset of surveyed tags and treating them as un-surveyed allows the SLAM system to obtain quantitative error numbers by comparing the estimated coordinates of these tags to the hidden but known ground truth tag corners (i.e., the surveyed tags with known locations).

In some embodiments, the GLS 102 is also able to mark and store a location identified by the user at 110, and associate a virtual note with the marked location (e.g., similar to an electronic version of a POST-IT note) at 112. This allows users to create, retrieve, edit and delete notes (i.e., text, images, audio messages, video message, etc.) at a specific 3D location in association with the 3D computer model of the structure, and overlay the note on the 3D computer model. Each marked location and associated note(s) is stored in a table. When a certain location in the model is encountered, the information is extracted from the table and displayed on the display (e.g., the helmet mounted display).

Figure 5:
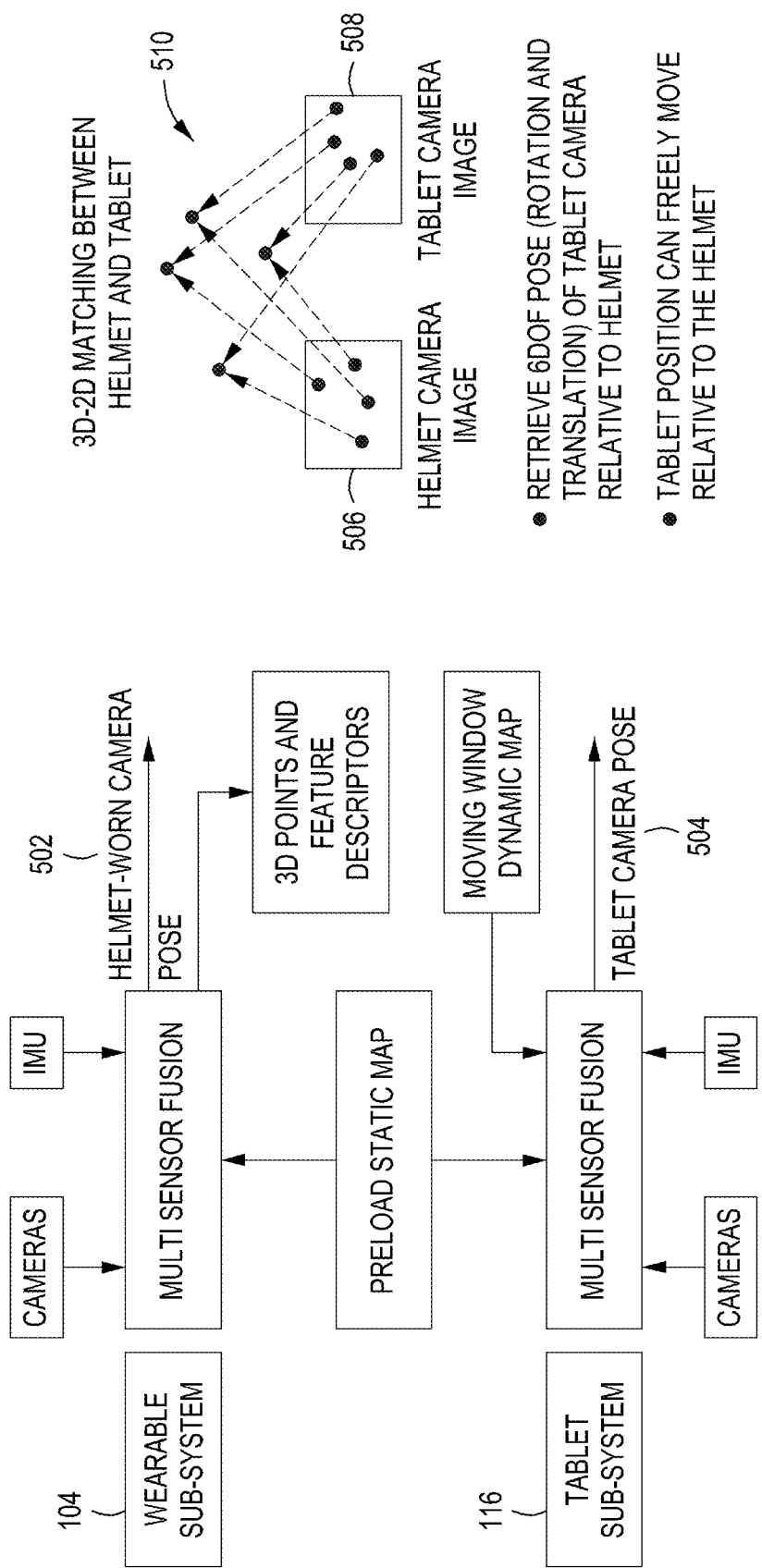
FIG. 5 depicts a functional block diagram of a handshaking process between a first sensor package and a second sensor package in accordance with an embodiment of the present principles.

As noted above, once the user is localized via the global localization system (GLS) 102, the next step is to determine a similar location with the 3D computer model of the structure prior to performing local measurements (i.e., index into the model). That information must be passed to the LMS 114 by the GLS 102. Similarly, after local measurements are performed by the LMS 114, those measurements must be placed in the global coordinate system. To facilitate this transfer of information between the GLS 102 and the LMS 114, In some embodiments, the global localization system (GLS) 102 is communicatively coupled to the local measurement system (LMS) 114 using wired or wireless communication protocols, as depicted by 115 in FIG. 1. In some embodiments, a handshaking process is performed between elements of the GLS 102 and the LMS 114 to align information between the two systems as described below with respect to in FIG. 5 in more detail. Specifically, as shown in FIG. 5, in some embodiments, the first sensor package 104 including helmet mounted cameras, sensors, and AR display may handshake with the second sensor package 116 including a tablet to align a pose captured by the second sensor package with the pose captured by the first sensor package. For example, the pose captured by the first or second sensor packages may be a six (6) degrees of freedom (6DOF) pose. This is achieved by sending a number of salient features (image feature descriptors and the corresponding 3D points) from the first sensor package 104 to the second sensor package 116 (left diagram in FIG. 5). The tablet sub-system 116 performs a 3D-2D matching (right diagram in FIG. 5) based on the features received (506 and 510) and the matched image features in the tablet image (508) to compute the 6DOF pose transformation (rotation and translation) between the tablet camera and the helmet camera. This transformation is then used to align the pose of the second sensor package with the pose of the first sensor package. This handshake procedure is initiated by the user (e.g., by pressing a button on the tablet or associated with the first sensor package) before recording a sequence for local inspection, to ensure that the second sensor poses are aligned to the global reference frame.

Figure 4:
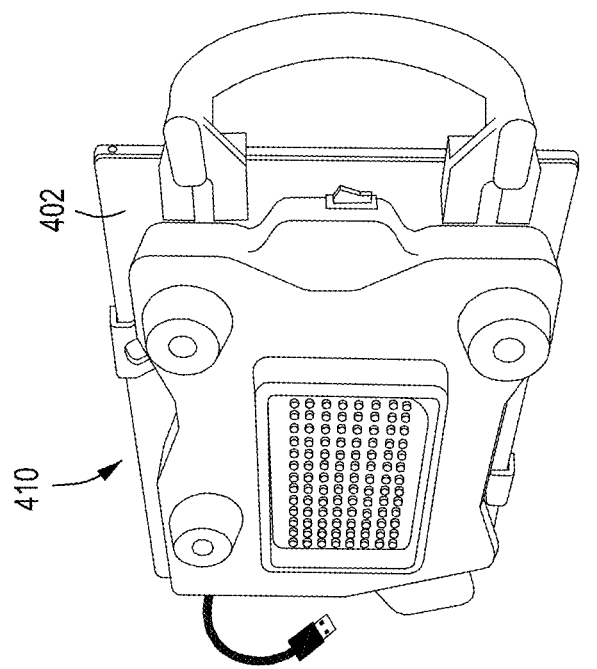
FIG. 4 depicts at least one embodiment of a second fine level measurement handheld sensor and display package in accordance with an embodiment of the present principles.
Figure 4:
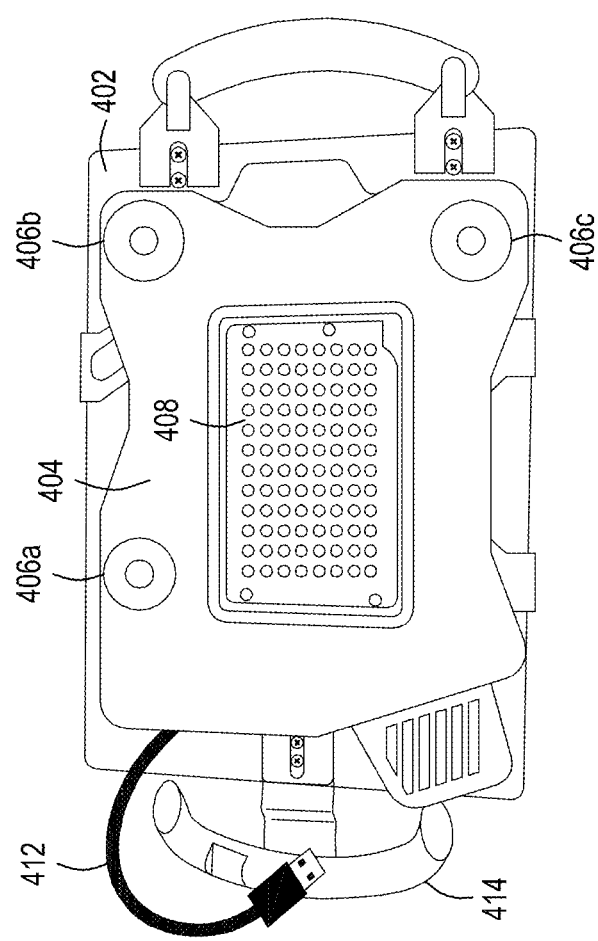

Local relative measurements performed by the LMS 114 are accomplished using a second sensor package 116 that yields higher resolution by working with a narrower field of view. In some embodiments, the second sensor package 116 used for local fine level relative measurements at a mm level of precision includes a handheld device, such as a tablet 402, that may include one or more cameras, a trinocular camera 406a-c, a high-resolution range sensor, IMU 410, GPS, visualization capabilities, illuminator for lighting 408, etc., as shown in FIG. 4. The handheld tablet 402 may also include handles 414 and a communication cable 412 (i.e., such as a USB cable) for transferring data. Local reconstruction of a scene of a structure can be placed in global coordinates with the accuracy of the global localization (i.e., about 5-15 cm level). If a blueprint (e.g. CAD model of a ship, BIM of a building) is available, accurate localization is achieved by aligning the local reconstruction to the blueprint. Inspection results and comparison to model can be shown on Augmented Reality (AR) glasses.

In some embodiments, the second sensor package 116 is configured to obtain fine level measurements (mm level measurements) and information about the structure, and the model recognition system 256 compare is configured to compare the fine level measurements and information obtained about the structure from the second sensor package to the 3D computer model of the structure. In some embodiments, the model recognition system 256 is further configured to generate a compliance report including discrepancies determined between the measurements and information obtained about the structure from the second sensor package and the 3D computer model of the structure.

FIGS. 2A and 2B depict a high-level block diagram of the various systems of the CAIS 100 and their relation/interaction to each other consistent with embodiments of the present disclosure. Specifically, as shown in FIG. 2A, the CAIS system 100 may consist of one or more devices associated with User A, one or more devices associated with User B, and server 250. The global localization system 102 described above is shown distributed in FIG. 2A with some elements of the GLS 102 being part of the first sensor package 104, and part of server 250. Similarly, the local measurement systems 114 described above is shown distributed in FIG. 2A with some elements of the LMS 114 being part of the second sensor package 116, and part of server 250. All devices associated with User A, User B, and server 250 are communicatively coupled to each other via networks 220.

The networks/cloud 220 comprise one or more communication systems that connect computers by wire, cable, fiber optic and/or wireless link facilitated by various types of well-known network elements, such as hubs, switches, routers, and the like. The networks 220 may include an Internet Protocol (IP) network or other packet-based communication networks, and may employ various well-known protocols to communicate information amongst the network resources. In some embodiments, User A devices (i.e., first sensor package 104A, and second sensor package 116A) can communicate directly with each other, with User B devices (i.e., first sensor package 104B, and second sensor package 116B), and server 250 through WIFI, BLUETOOTH, or any other wireless or wired communication protocols.

Each first sensor package 104 may comprise a Central Processing Unit (CPU) 202, support circuits 204, display 206, memory 208, geolocation tracking module 210, virtual marking module 212, and model information 214.

Each second sensor package 116 may comprise a Central Processing Unit (CPU) 202, support circuits 204, display 206, memory 208, measurement module 216, model comparison module 218, and model information 214.

The server 250 may comprise a Central Processing Unit (CPU) 202, support circuits 204, display 206, memory 208, SLAM system 252, 3D alignment system 254, model recognition system 256, and model information 214.

The CPU 202 may comprise one or more commercially available microprocessors, microcontrollers, FPGA, etc. that facilitate data processing and storage. The various support circuits 204 facilitate the operation of the CPU 202 and include one or more clock circuits, power supplies, cache, input/output devices and circuits, and the like. The input/output devices of support circuits 204 may include audio input and output (e.g., commands or instructions for repairs where discrepancies are found). In some embodiments, the display 206 may be an AR display as part of a helmet mounted display as shown and described with respect to FIG. 3 for the GLS 102. In some embodiments the display 206 may be a hand held device display (e.g., a tablet) as part of the second sensor package 116 as shown and described with respect to FIG. 4 for the LMS 114. The memory 208 comprises at least one of Read Only Memory (ROM), Random Access Memory (RAM), disk drive storage, optical storage, removable storage and/or the like.

In operation, user A may be using a first sensor package 104A as part of GLS 102A to track and geolocate their position across a worksite (e.g., a construction site, a ship or ship building yard, railroad tracks, etc.) to within 5-15 cm, or about 10 cm, in a global coordinate system using a first sensor package 104 (e.g., body worn equipment as shown in FIG. 3). The information obtained from the first sensor package 104 is used by the geolocation tracking module 210 and SLAM system 252 to globally localize the user. In some embodiments, the geolocation tracking module 210 may itself include a SLAM system 252 as described above to globally localize the user. In other embodiments, the geolocation tracking module 210 may communicate with SLAM system 252 on server 250 which will perform the localization calculations/determination and provide that information back to first sensor package 104.

Once the user is localized within a 3D computer model of the structure being inspected, the user may mark and store a location (i.e., coordinates) identified by the user, and associate a virtual note with the marked location (e.g., similar to an electronic version of a POST-IT note) using virtual marking module 212. This allows users to create, retrieve, edit and delete notes (i.e., text, images, audio messages, video message, etc.) at a specific 3D location in association with the 3D computer model of the structure, and overlay the note on the 3D computer model. Each marked location and associated note(s) is stored in a table. When a certain location in the model is encountered, the information is extracted from the table and displayed on the display (e.g., the helmet mounted display). Locations marked by User A and associated virtual notes may be seen by User B via User's B's display 206. In some embodiments, User A and User B may be able to see what each other sees and/or communicate with each other audibly or visually, while walking around the site/structure.

Once the user is localized within a 3D computer model of the structure, the user may initiate local inspection and measurement of a local area of the structure. The user may select an object or press a button on the first sensor package 104 or second sensor package 116 to initiate the handshaking process described above with respect to FIG. 5 to align a pose captured by the second sensor package with a pose captured by the first sensor package. This alignment may be performed by the 3D model alignment module 254 of server 250 or local on the second sensor package 116. After the handshaking is complete and the models are aligned, local measurements may be performed by measurement module 216 and/or model recognition system 256. The measured information is then compared to the model information and discrepancies are determined.

As described above, at least some of the advantages provided by the embodiments disclosed herein and shown in FIGS. 1, 2A and 2B include: obtaining relative measurements of structures, and portions thereof, without 3D computer models of the structure (e.g., without a BIM), and measure distances in a 3 m×3 m area with mm precision (118, 120); performing visual inspections by displaying 3D computer models of the structure (e.g., a BIM) overlaid on the video/display image (122, 124); performing local inspections to determine structural information such as, but not limited to, number of structural support elements, diameter/thickness of the support elements, pitch between each support element, and tensile markings within a 0.1 meter-10 meter section with or without a 3D computer models of the structure to check against (126, 128); performing worksite localization to localize the user within 5-15 cm across the building construction site or within a large structure such as a ship, for example, relative to markers laid out throughout the site (106, 108); and providing the ability to use virtual notes (e.g., similar to an electronic version of a POST-IT note) that allows adding and retrieving notes (text, images, audio messages, video message, etc.) at a specific 3D location in association with the 3D computer model of the structure (110, 112).

Figure 6:
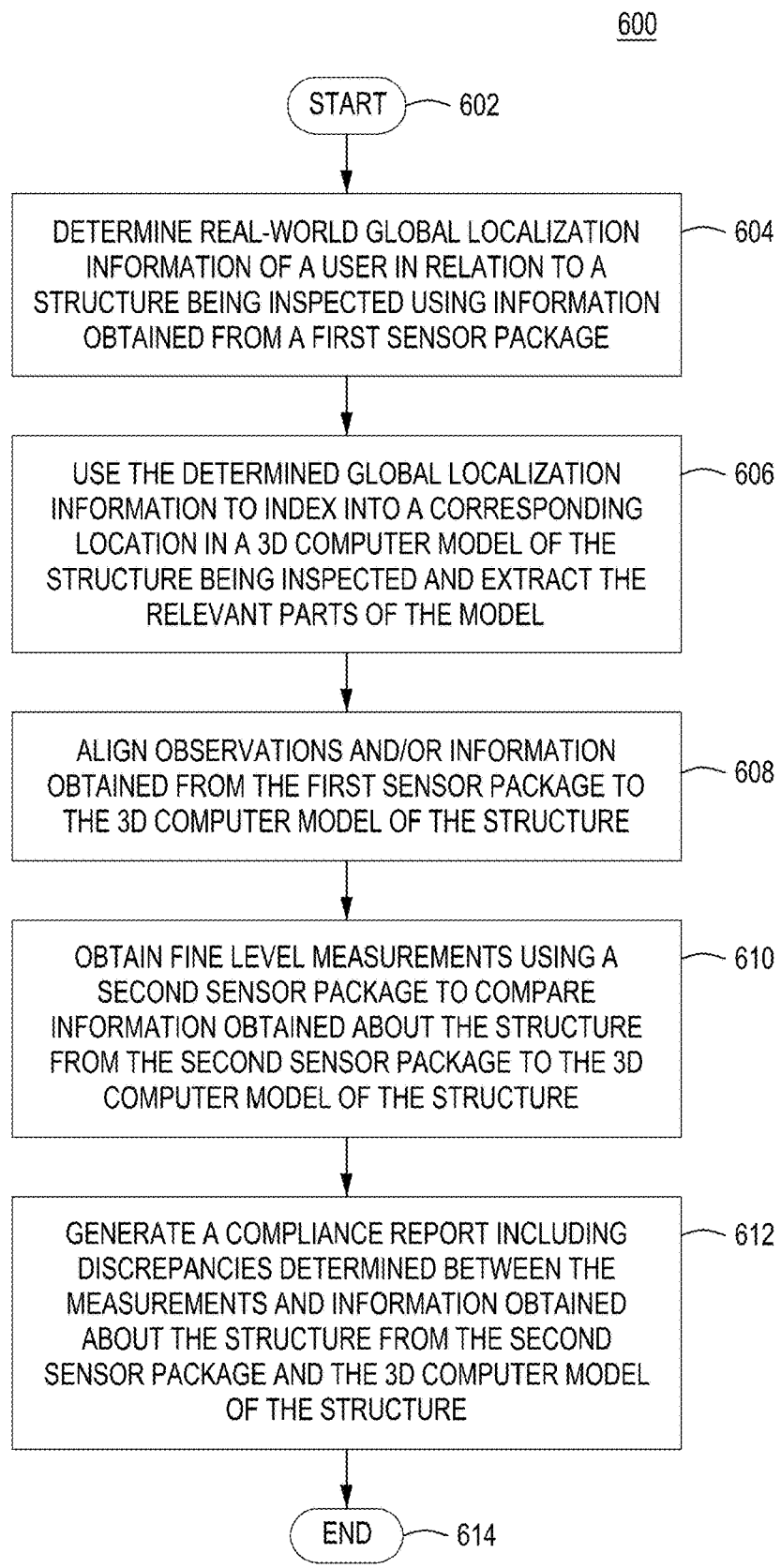
FIG. 6 depicts a flow diagram of a computer aided inspection method for inspection, error analysis and comparison of structures in accordance with a general embodiment of the present principles.

FIG. 6 depicts a flow diagram of a computer aided inspection method 600 for inspection, error analysis and comparison of structures in accordance with a general embodiment of the present principles. The method 600 starts at 602 and proceeds to 604 where real-world global localization information is determined for a user in relation to a structure being inspected using information obtained from a first sensor package. At 606, the determined global localization information is used to index into a corresponding location in a 3D computer model of the structure being inspected and extract the relevant parts of the model. The method proceeds to 608 where observations and/or information obtained from the first sensor package are aligned to the 3D computer model of the structure.

At 610, fine level measurements are obtained using a second sensor package to compare information obtained about the structure from the second sensor package to the 3D computer model of the structure. The method proceeds to 612 where discrepancies between the measurements and information obtained about the structure from the second sensor package and the 3D computer model of the structure are determined and compiled, and a compliance report is generated including those discrepancies or information/summary about the discrepancies. The discrepancies determined between the measurements and information obtained about the structure and the 3D computer model of the structure may include differences in the number of structural support elements measured versus the number of structural support elements in the model, differences in the diameter/thickness of the support elements, pitch between each support element, tensile markings on various support elements, angles of railroad tracks and/or support elements, etc. The compliance report may include, for example, what was measured and where the discrepancies are. In some embodiments, the measured data is compared to the model data, and values that exceed a predetermined threshold (e.g., 0.1-25% of expected value) may be flagged as a discrepancy and included in the compliance report. In some embodiments, if a measured value exceeds a predefined threshold, the element in error would be repaired/corrected and re-inspected. For example, if a crack is found in a structural element, all work associated with that element will stop until it is corrected. In other examples, the as long as the pitch or gage is within a certain tolerance (i.e., predefined threshold), it may be considered acceptable and work may proceed. In some embodiments, the discrepancies may be visually detected by displaying 3D computer models of the structure (e.g., a BIM) overlaid on the video/display image (122, 124). The user can mark those areas of discrepancies with virtual notes as described above (110,112). The method ends at 614.

Figure 7:
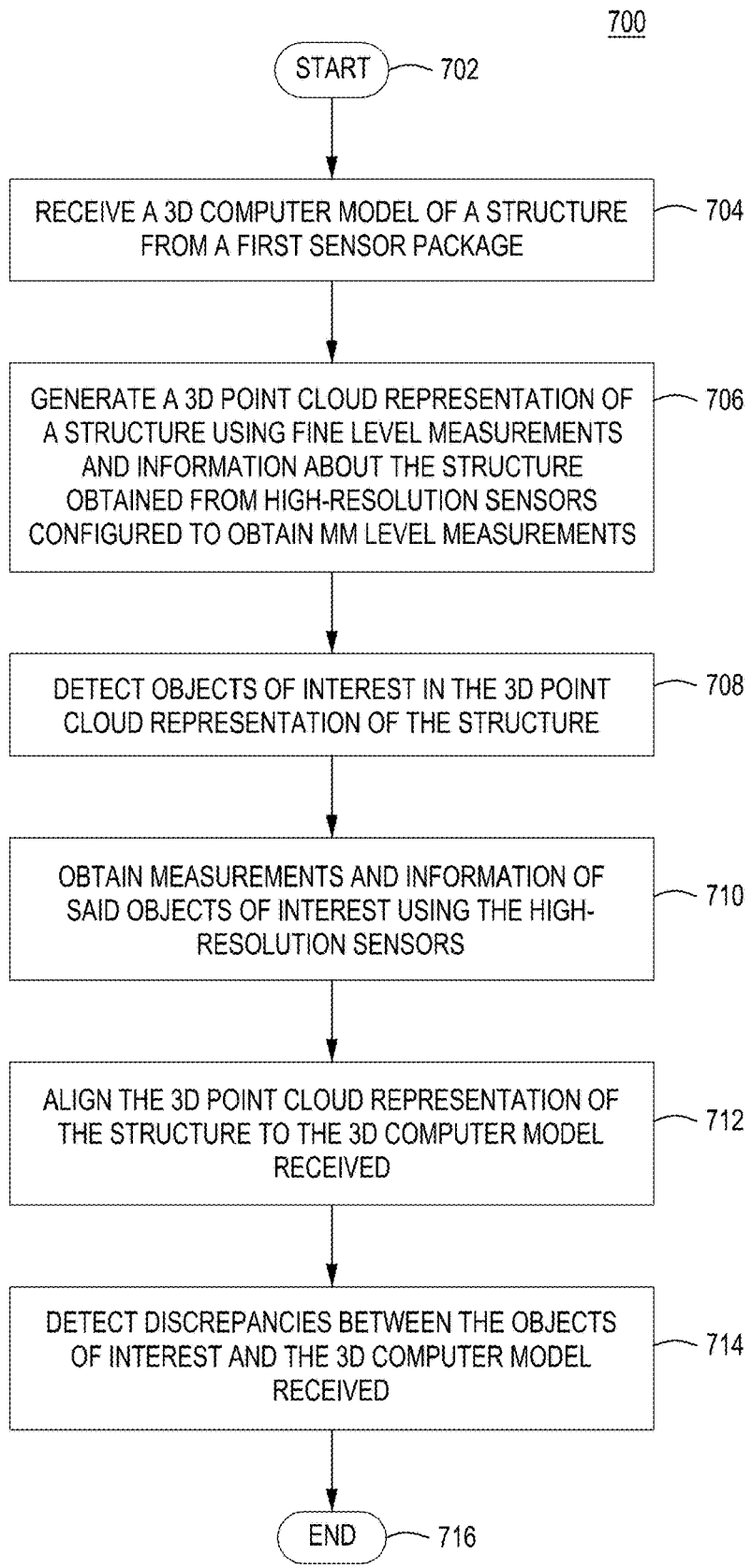
FIG. 7 depicts a flow diagram of at least one other embodiment of a computer aided inspection method for inspection, error analysis and comparison of structures in accordance with a general embodiment of the present principles.

FIG. 7 depicts a flow diagram of a computer aided inspection method 700 for inspection, error analysis and comparison of structures in accordance with a general embodiment of the present principles. The method 700 starts at 702 and proceeds to 704 where a 3D computer model of a structure is received from a first sensor package. At 706, a 3D point cloud representation of the structure is generated using fine level measurements and information about the structure obtained from high-resolution sensors configured to obtain mm level measurements. The method proceeds to 708 where objects of interest and detected in the 3d point cloud representation of the structure, and at 710, measurements and information of said objects of interest are obtained using the high-resolution sensors. At 712, the 3d point cloud representation of the structure is aligned to the 3D computer model received. The method proceeds to 714 where discrepancies are detected between the objects of interest and the 3d computer model received as described above with respect to 612 of FIG. 6. In some embodiments, detecting the discrepancies further includes generating a compliance report including the discrepancies determined. The method ends at 716.

Various use cases employing the systems and methods described above are now described. Specifically, the systems described herein integrate two key capabilities, a GLS 102 to perform global localization and alignment, and an LMS 114 to perform fine measurements and error detection. The first capability enables the users to walk around a large worksite and locate themselves within the site at an accuracy of about 10 centimeters and overlay AR icons on the wearable display. Doing localization to 10 cm precision, will also enable the system to automatically match the model to the high-precision tablet video without user intervention. The second capability enables the users to make high-precision and high-accuracy measurements (millimeter level). As used herein, accuracy refers to the closeness of a measured value to a standard or known value while precision refers to the closeness of two or more measurements to each other. For example, precision means that if you measure something 10 times, the measurement is always consistent (i.e., it is always the same even if it is wrong). Meanwhile, accuracy refers to the right measurement. Therefore, high-precision and high-accuracy measurements refers to both consistent and accurate measurements to the millimeter level. These systems and techniques can generally be applied to various application.

Typically, in the use cases described below, a tablet with an attached stereo sensor head for making the 1 mm precision measurements, with a high-resolution video display screen is used for local measurements (as part of LMS 114—i.e., the second sensor package), and an independent head-mounted optical-see-through display for localizing the user to 5 cm to about 15 cm accuracy, or about 10 cm accuracy and providing augmented reality overlays to the user anywhere on the worksite (as part of GLS 102—i.e., the first sensor package). As described above with respect to FIGS. 6 and 7, discrepancies determined between the measurements and information obtained about the structure obtained from the second sensor package, and the 3D computer model of the structure may include differences in the number of structural support elements measured versus the number of structural support elements in the model, differences in the diameter/thickness of the support elements, pitch between each support element, tensile markings on various support elements, angles of railroad tracks and/or support elements, etc.

Figure 8A:
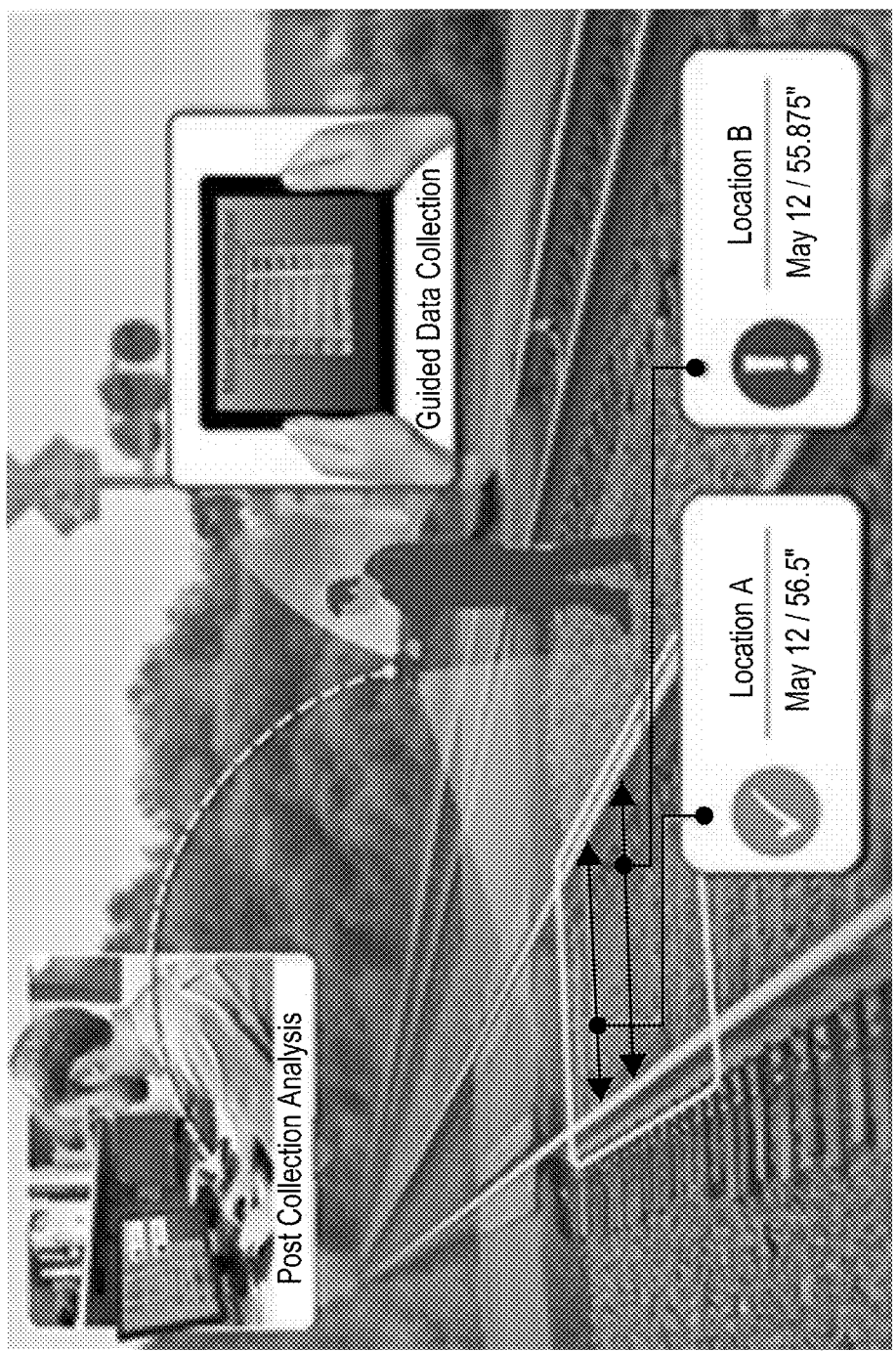
FIGS. 8A and 8B depict operation of a CAIS used for rail tracks and an associated system diagram for said CAIS used for rail tracks in accordance with a general embodiment of the present principles.

This technology has many applications. In one use case, the CAIS is used for inspection of rail tracks. Specifically, Railroad tracks need to be inspected monthly to assess for deviations as small as 1/16 of an inch from the prescribed values. The current inspection procedure is completely manual, labor intensive and exclusively relies on human observation and measurements. To date there is limited technology and systems achieving automated quantitative data of track conditions from a human-portable system. By employing embodiments of the CAIS described herein, a system for automating the track inspection is achieved as shown in FIGS. 8A-8E Specifically, as shown in FIG. 8A, a video-based 3D recovery and measurement system for automated rail inspection is depicted. In some embodiments, an operator records video along the track with the data capture system using a fine level sensor package (e.g., such as the second sensor package 116 described above), following the guidance displayed on the screen. A 3D model of the track is generated from the collected video and used for generating the measurements required and determining if any regions are non-compliant with specifications (e.g., requirements/specifications defined in the Track and Rail and Infrastructure Integrity Compliance Manual). For example, non-compliant items may include center-cracked or broken joint bars, number of center-cracked or broken joint bars, multiple defective conditions occurring at the same location (e.g., joint tie defect with a center-cracked bar, a geometry defect with defective ties, etc.), "breakout in rail heads", missing nails, track defects caused by improper repairs (installation of a joint bar that is not of a structurally sound design and dimension for the rail on which it is applied, or failure to drill holes in rail ends not complying with TSS), defective turnout ties or poor support causing a spring rail frog to have excessive clearance between the hold-down housing and the horn(s), gouging or contact by the outside of the wheels against the gage side of the wing rail, excessively chipped or worn switch points that are so chipped or worn as to present a significant derailment hazard.

Figure 8B:
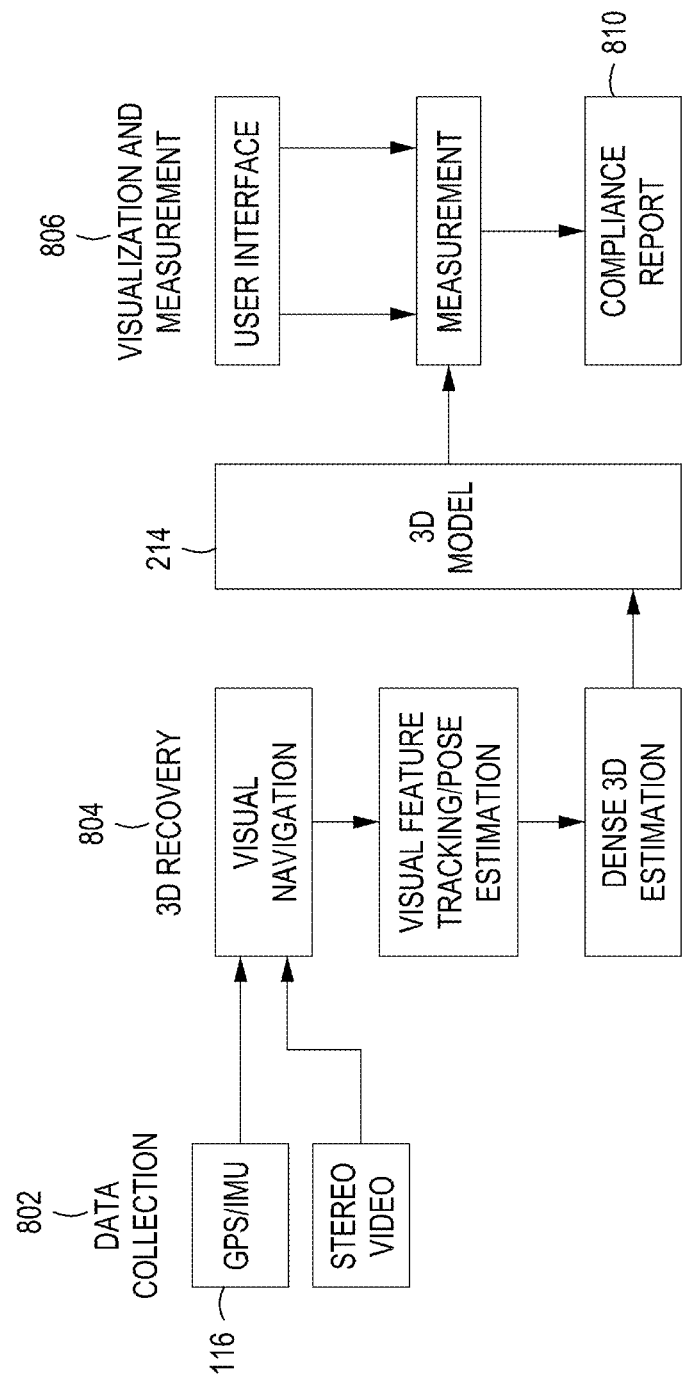

A system diagram for the proposed approach is presented in FIG. 8B. As shown in FIG. 8B, data collection (802) by the fine level sensor package 116 for this use case may consist of a sensor head and 12-inch tablet PC that runs the data collection application and provides the user interface through its touch screen display. The sensors will be powered from a battery that can be carried in a backpack or on a belt. The sensor head has a stereo pair of high-definition cameras (e.g., 1920×1200 pixels) with a 25-cm baseline and 50 degrees horizontal Field of View lenses as well as a GPS/IMU unit.

The 3D recovery module 804 generates a dense 3D point cloud from a sequence of images with multiple views of the same area on the ground obtained by the sensor package 116. The 3D recovery module 804 first runs Visual Navigation on the input video sequence to obtain initial pose estimates for each image. Based on these poses a subset of images (key-frames) is selected for 3D recovery. Next, feature tracks are generated across multiple frames and then Bundle Adjustment is run to refine the camera poses, and 3D point locations corresponding to each feature track. The Bundle Adjustment step uses the fact that the relative motion between the left and right camera is constant over time and it is known from calibration to fix the scale of the 3D reconstruction. Finally, the 3D point clouds from each stereo pair are aggregated to generate a dense point cloud for the inspected area. The 3D model 214 is provided as input to the Visualization and Measurement tool 806. The first step is the automatic detection of the rails based on their known 3D profile. Next, several measurements are performed to determine regions that are not compliant and included in a compliance report 810. As an example, for gage (distance between tracks) measurements, the following steps are performed: align the local point cloud so that the main track direction is aligned with the Y axis; divide the rail points in chunks along the track (e.g. one foot long) and fit a plane through the classified rail points; use the point distribution along the X axis to fit the local tangent to each rail and measure distance between the center point of each segment; and repeat for every section along the track to generate a list of measurements.

In addition to inspection of rail tracks and construction sites as described above, other examples of applications include repair and maintenance of large structures such as ships, buildings, and aircraft. For example, in the case of ship building, as described with respect to FIGS. 1-7 above, the system would globally localize the user in the ship using the GLS 102 by acquiring and tracking image features using a first sensor package 104 and matching visual landmarks, tags, or location coordinates to a pre-built map of the ship. Using information acquired by the first sensor package 104, the GLS 102 is able to track a user's location across a ship to within 5-15 cm, or about 10 cm, in a global coordinate systems at 106 in FIG. 1. The system would then index in the appropriate portion of a model of the ship based on the user's location, and assist the user in repair, maintenance by overlaying instructions and providing audio cues on what to do next. For example, once the sensor package is localized in the CAD model reference frame, any component from the CAD model can be presented as an Augmented Reality overlay in the display (tablet or optically see through HMD). This functionality enables quick visual inspection of constructed elements, e.g. verifying that the location of air ducts, pipes, beams, etc. matches the model/plan, as well as visualizing the location of elements not yet constructed.

In CAIS system 100 can also be used for training and guidance for emergency situations, e.g., switching off a furnace in a factory, which must be done in a certain sequence of steps executed over a large area. The inventive system would guide the user through safety and emergency response procedures with visual (AR) and vocal instructions. The user can ask questions and interactively diagnose problems. The system would display overlaid animations with directions on an HMD worn or tablet/smartphone carried by user. The system may further automatically observe user actions and provide warnings and feedback The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 9:
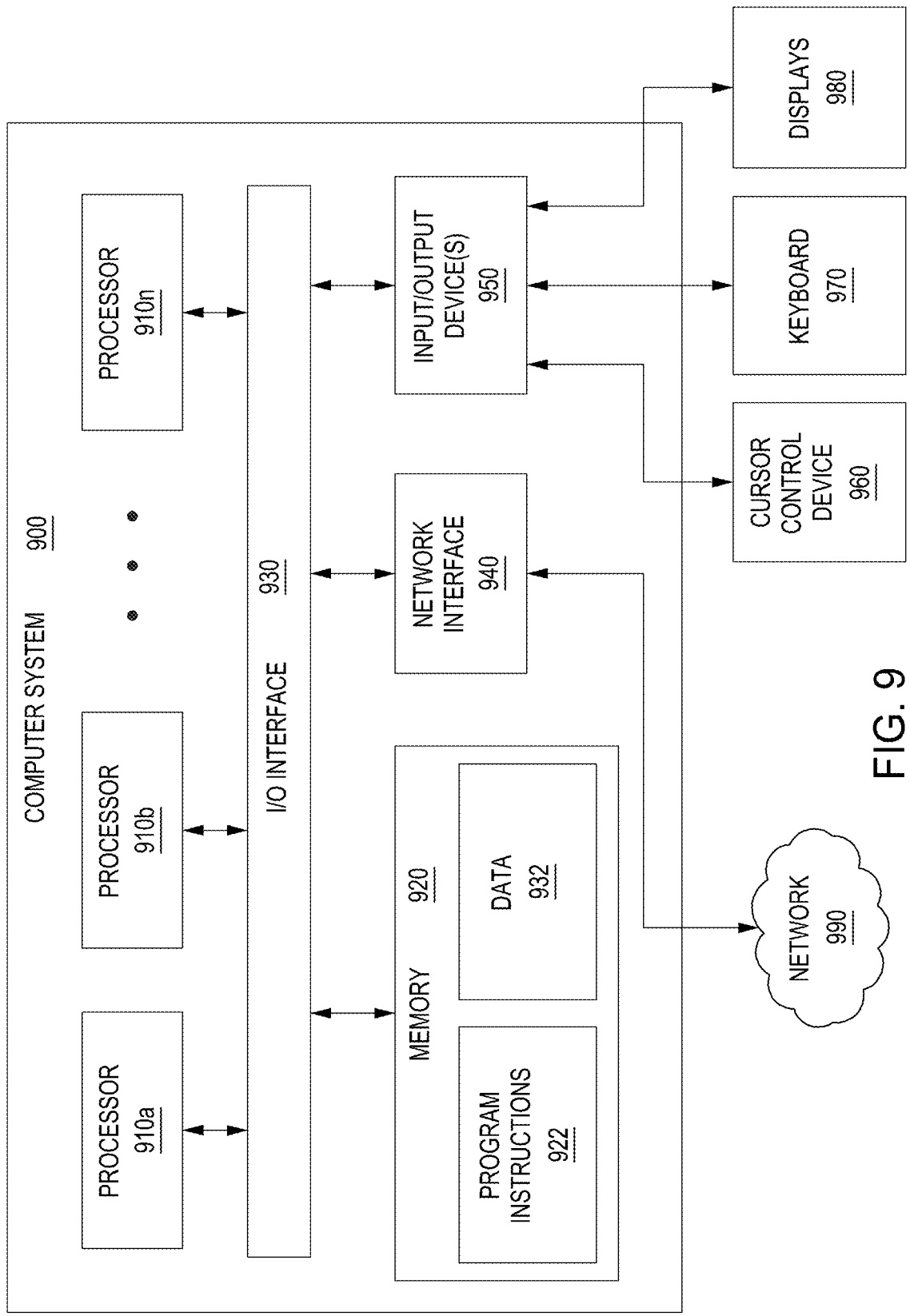
FIG. 9 is a depiction of a computer system that can be utilized in various embodiments of the present invention.

FIG. 9 depicts a computer system 900 that can be utilized in various embodiments of the present invention to implement the computer and/or the display, according to one or more embodiments.

Various embodiments of method and apparatus using augmented reality and localization techniques to assist in performing fine level inspections and comparisons to 3D model of structures for applications such as surveying, inspection, maintenance and repair, as described herein, may be executed on one or more computer systems, which may interact with various other devices. One such computer system is computer system 900 illustrated by FIG. 9, which may in various embodiments implement any of the elements or functionality illustrated in FIGS. 1-8B. In various embodiments, computer system 900 may be configured to implement methods described above. The computer system 900 may be used to implement any other system, device, element, functionality or method of the above-described embodiments. In the illustrated embodiments, computer system 900 may be configured to implement the methods 600 and 700 as processor-executable executable program instructions 922 (e.g., program instructions executable by processor(s) 910) in various embodiments.

In the illustrated embodiment, computer system 900 includes one or more processors 910a-910n coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In various embodiments, any of the components may be utilized by the system to receive user input described above. In various embodiments, a user interface may be generated and displayed on display 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In different embodiments, computer system 900 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs). In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more external systems or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the operations and methods described above, such as the methods illustrated by the flowcharts of FIGS. 6 and 7. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

The invention claimed is:

1. A computer aided inspection system for inspection, error analysis and comparison of structures comprising:
a simultaneous localization and mapping (SLAM) system configured to determine real-world global localization information of a mobile user in relation to a structure being inspected as the user moves through the structure using information obtained from a first sensor package including a camera and at least one of an Inertial Measurement Unit (IMU), a barometer, an altimeter, or a global positioning system (GPS) device, wherein the global localization information localizes the user to within 5 centimeter (cm) to 15 cm across a worksite where the structure is located;
a model alignment system configured to:
use the determined global localization information to index into a corresponding location in a three-dimensional (3D) computer model of the structure being inspected and extract a local area of the 3D computer model; and
align observations and/or information obtained from the first sensor package to the local area of the 3D computer model of the structure extracted;
a second sensor package including a handheld device having a display and one or more cameras configured to obtain fine level local measurements at a millimeter (mm) level of precision and information about the structure; and
a model recognition system configured to compare the fine level measurements and information obtained about the structure from the second sensor package to the 3D computer model of the structure to determine discrepancies between the measurements and information obtained about the structure and the 3D computer model of the structure, wherein the discrepancies include differences in at least one of a number of structural support elements measured, diameters and/or thickness of one or more support elements, pitch between two or more support elements, tensile markings on one or more support elements, or angles of one or more support elements.

2. The computer aided inspection system of claim 1, wherein the model recognition system is further configured to generate a compliance report including discrepancies determined between the measurements and information obtained about the structure from the second sensor package and the 3D computer model of the structure.

3. The computer aided inspection system of claim 2, wherein discrepancies that exceed predefined error threshold are included in the compliance report.

4. The computer aided inspection system of claim 1, wherein the second sensor package includes one or more high-resolution sensors with narrow field of view configured to obtain mm level measurements.

5. The computer aided inspection system of claim 1, wherein the first sensor package includes a helmet worn augmented reality (AR) display, wherein the 3D computer model is overlaid on the AR display, and wherein the system is configured to mark and store a location in the model identified by the user, and associate a virtual note with the marked location.

6. The computer aided inspection system of claim 5, wherein the second sensor package includes a hand held device having a display, and wherein the hand held device includes a selectable object that is configured to initiate inspection and measurement of a local area of the structure responsive to selection of the object.

7. The computer aided inspection system of claim 5, wherein the first sensor package is configured to communicatively handshake with the hand held device to align a pose captured by the hand held device with the pose captured by the first sensor package.

8. The computer aided inspection system of claim 7, wherein the pose captured by the first sensor package and/or the hand held device is a six (6) degrees of freedom (6DOF) pose, and wherein handshaking is achieved by sending a number of salient features from the first sensor package to the hand held device.

9. The computer aided inspection system of claim 1, wherein the simultaneous localization and mapping system uses real world tags having a known location to localize the user.

10. The computer aided inspection system of claim 1, wherein the simultaneous localization and mapping system is configured to determine localization information about the user in a GPS-denied or GPS-restricted environment.

11. The computer aided inspection system of claim 1, wherein the model alignment system is further configured to align a point cloud model of the structure with the 3D computer model, wherein point cloud model of the structure is created from the measurements and information obtained from at least one of the first or second sensor packages.

12. A computer aided inspection method for inspection, error analysis and comparison of structures comprising:
determining real-world global localization information of a mobile user in relation to a structure being inspected as the user moves through the structure using information obtained from a first sensor package including a camera and at least one of an Inertial Measurement Unit (IMU), a barometer, an barometer, or a global positioning system (GPS) device, wherein the global localization information localizes the user to within 5 centimeter (cm) to 15 cm across a worksite where the structure is located;
using the determined global localization information to index into a corresponding location in a three-dimensional (3D) computer model of the structure being inspected and extract a local area of the 3D computer model; and
aligning observations and/or information obtained from the first sensor package to the local area of the 3D computer model of the structure extracted;
obtaining fine level local measurements at a millimeter (mm) level of precision and information about the structure from a second sensor package including a handheld device having a display and one or more cameras; and
comparing the fine level measurements and information obtained about the structure from the second sensor package to the 3D computer model of the structure to determine discrepancies between the measurements and information obtained about the structure and the 3D computer model of the structure, wherein the discrepancies include differences in at least one of a number of structural support elements measured, diameters and/or thickness of one or more support elements, pitch between two or more support elements, tensile markings on one or more support elements, or angles of one or more support elements.

13. The method of claim 12, further comprising:
generating a 3D point cloud representation of the structure using mm level measurements and information about the structure obtained from high-resolution sensors of the second sensor package;
detecting objects of interest in the 3D point cloud representation of the structure, and obtaining measurements and information of said objects of interest using the high-resolution sensors;
aligning the 3D point cloud representation of the structure to the 3D computer model received; and
detecting discrepancies between the objects of interest and the 3D computer model received.

14. The method of claim 13, further comprising:
generating a compliance report including the discrepancies detected between the objects of interest and the 3D computer model received.

15. The method of claim 12, further comprising:
marking and storing a location identified by a user within the 3D computer model and associate a virtual note with the marked location; and
overlaying the virtual note on the 3D computer model such that it is visually displayed for any user to see.

* * * * *